United States Patent
Budaker et al.

(10) Patent No.: US 6,948,584 B2
(45) Date of Patent: Sep. 27, 2005

(54) STEERING DEVICE

(75) Inventors: Martin Budaker, Heubach (DE); Wilfried Leutner, Schwaebisch Gmuend (DE); Helmut Knoedler, Lorch (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 98 days.

(21) Appl. No.: 10/478,247

(22) PCT Filed: Jun. 26, 2002

(86) PCT No.: PCT/EP02/07059
§ 371 (c)(1),
(2), (4) Date: Nov. 19, 2003

(87) PCT Pub. No.: WO03/002395
PCT Pub. Date: Jan. 9, 2003

(65) Prior Publication Data
US 2004/0149509 A1 Aug. 5, 2004

(30) Foreign Application Priority Data
Jun. 26, 2001 (DE) .......................................... 101 30 812

(51) Int. Cl.[7] ................................................ B62D 5/00
(52) U.S. Cl. ........................ 180/405; 180/406; 180/403
(58) Field of Search ................................ 180/403–407, 180/441–444, 446

(56) References Cited

U.S. PATENT DOCUMENTS

| 4,217,968 A | | 8/1980 | Dezelan | |
|---|---|---|---|---|
| 4,476,677 A | * | 10/1984 | Hanshaw | ...................... 60/328 |
| 4,574,904 A | * | 3/1986 | Goode | ........................ 180/406 |
| 4,942,935 A | * | 7/1990 | Lech | ........................... 180/406 |
| 5,509,493 A | | 4/1996 | Lang et al. | |
| 5,845,736 A | | 12/1998 | Bohner et al. | |
| 5,950,757 A | | 9/1999 | Saita et al. | |
| 6,076,627 A | * | 6/2000 | Bohner et al. | ............... 180/422 |
| 6,102,150 A | * | 8/2000 | Bohner et al. | ............... 180/403 |
| 6,305,490 B1 | | 10/2001 | Loos et al. | |
| 6,313,389 B1 | * | 11/2001 | Adachi | ......................... 84/634 |
| 6,354,393 B1 | * | 3/2002 | Ahlert et al. | ................ 180/403 |

FOREIGN PATENT DOCUMENTS

| DE | 195 41 749 | 5/1997 |
|---|---|---|
| DE | 197 52 397 | 6/1998 |
| DE | 198 40 625 | 3/2000 |
| DE | 199 46 073 | 5/2001 |
| EP | 0 562 426 | 9/1993 |
| EP | 0 624 135 | 6/1996 |

OTHER PUBLICATIONS

Altmann, Uwe; Elektrisch abschaltbare Antriebseinheiten fuer Lenksysteme im Pkw. In: ATZ Automobiltechnische Zeitschrift 98, 1996, H. 5, S. 254–261.

Neue Servolenkung spart Kraftstoff: Krafthand, H. 17, Sep. 10, 1994, Seite 1282–1283.

* cited by examiner

Primary Examiner—Lesley D. Morris
Assistant Examiner—L. Lum
(74) Attorney, Agent, or Firm—Kenyon & Kenyon

(57) ABSTRACT

A steering system, e.g., a hydraulic rack and pinion steering system for motor vehicles, includes a steering handle for prescribing a steering intention, a pressure medium source and a control valve device for controlling a flow of pressure medium to and from a servomotor in order to deflect vehicle wheels. The control valve device has a closed center, and a pressure medium accumulator is provided for producing and/or assisting a flow of pressure medium to and from the servomotor.

13 Claims, 2 Drawing Sheets

STEERING DEVICE

FIELD OF THE INVENTION

The present invention relates to a steering device for a motor vehicle having components of a hydraulic steering system, e.g., a hydraulic rack and pinion steering system.

BACKGROUND INFORMATION

In such power assisted steering systems, a pinion is generally mounted rotatably in a steering housing and is held in engagement with a rack which is axially displaceably arranged in the steering housing. A servomotor which is drive-connected to the rack serves to provide power assistance. In this case, a pressure medium source, comprising a pump and a drive, serves, in connection with a control valve device, to control a flow of pressure medium to and from the servomotor as a function of a movement of the pinion.

European Published Patent Application No. 0 624 135 describes a power assisted rack and pinion steering system of this type. Here, the control valve device is configured as two control valves which have seat valves, the axes of which are substantially perpendicular to the axis of the pinion. If, by rotating the steering handwheel, the pinion is also rotated, counter to the resistance of the rack, then its floating bearing is displaced. This displacement is transmitted to the control valves. In this manner, the control valves are controlled by the steering handle (with the interaction of the rack which offers resistance). As seat valves are used, small movements of the pinion are sufficient to actuate and control the control valves. The movement of the control valves leads to pressure building up in the correspondingly provided cylinder space and thus produces assistive power for deflecting the vehicle wheels by the servomotor.

German Published Patent Application No. 195 41 749 describes a power steering system for motor vehicles having a servovalve configured as a rotational slide arrangement. It is provided here that a steering handle, arranged without a positive coupling to the steered vehicle wheels, actuates a steering angle setpoint generator and interacts with an actuating motor. The servovalve in this case has what is referred to as an open center, i.e., all connections communicate with one another when the rotational slide and the control sleeve assume a central position relative to one another. An electric motor is arranged in this case at one end of the rotational slide and is capable, on account of corresponding pulses, of rotating the rotational slide and the control sleeve in the corresponding direction.

The steering system disclosed in German Published Patent Application No. 195 41 749 may be relatively costly, in particular also for interventions in vehicle dynamics. The energy consumption is higher compared with a conventional power steering system. This also results in corresponding heat losses which have to be dissipated in a costly manner, for example, by the use of an oil cooler. Steering must be carried out with the aid of the electric motor if the hydraulics or an essential component fails. In this case, the electric motor and the corresponding parts have to be designed for this type of use and correspondingly to be of sufficiently large dimensions. The requirement for high dynamics means that the motors become very expensive. The electric motor thus requires a correspondingly large amount of energy from the vehicle-mounted electrical system, with the result that the latter has to be designed to supply sufficient power. The parts relevant to safety, such as the vehicle-mounted electrical system, for example, have to be present in duplicate on account of the safety requirements for such power assisted steering systems, so that higher costs are incurred.

These disadvantages also hold, at least partially, in analogous fashion for the other conventional power assisted steering systems and for the power assisted steering system described in European Published Patent Application No. 0 624 135.

Moreover, it may be disadvantageous in the case of conventional power assisted steering systems that both the instantaneously required energy and the mean energy is relatively high, and in particular the electric motor and the associated parts have to be designed for peak loads (which occur, for example, during parking).

It is an aspect of the present invention to provide, e.g., a reliable, simple and cost effective design of, a steering system, which may ensure that the vehicle may be stopped safely even if the hydraulic system fails.

SUMMARY

In accordance with an example embodiment of the present invention, the vehicle may be brought safely to a standstill even if the hydraulic system fails by virtue of the fact that the control valve device has a closed center and a pressure medium accumulator is provided for producing and/or assisting a flow of pressure medium to and from the servomotor. If the hydraulic unit, for example, the pump, fails, the energy contained in the pressure accumulator may be used for post-failure operation. It may thus not be necessary to design electric motors, which are used for steering if the hydraulic system fails, with correspondingly costly and large dimensions.

A pressure, which may be used to lower peak loads, for example, during parking, may be built up or stored in the pressure accumulator on account of the control valve device being designed with a closed center. The pressure medium source or the pump and the electric motor driving the pump may thus be designed for a mean load. The other participating components, such as the vehicle-mounted electrical system, for example, also merely have to be designed for the operation of a pressure medium source with a mean energy requirement.

It may be unnecessary to use either the vehicle-mounted electrical system or the electric motor for "emergency operation", i.e., in order to deflect the vehicle wheels if the hydraulic system fails.

An example embodiment of the present invention may thus allow a cost effective, reliable and simple design of the steering system. It may be possible to dispense with a redundant design of the electric motor and/or of the vehicle-mounted electrical system and the pump, as the energy contained in the pressure accumulator may be sufficient to safely bring the vehicle to a standstill. The electric motor may need to be designed only for actuating the valves and not for supplying steering power.

The control valve device may be actuated by an actuating motor which is not positively coupled to the steering handle.

The control valve may be actuated in a particularly simple and cost effective manner by an actuating motor which is not positively connected. The previously existing problem, as resulting, for example, from German Published Patent Application No. 195 41 749, e.g., that such actuating motors have to be of powerful and redundant design in order for them to be able to ensure deflection of the vehicle wheels if the hydraulic system fails, may no longer be necessary as a result of a pressure accumulator and a control valve device with a closed center being used.

An actuating motor may be used in series, e.g., to reduce cost, by using a pressure accumulator and a control valve device with a closed center. The actuating motor may be designed only for actuating the control valve device and not for deflecting the vehicle wheels. As the actuating motor may normally be of redundant configuration, i.e., two are present, considerable costs may thus be saved. It is also possible to configure the components which interact with the actuating motor, such as the vehicle-mounted electrical system, for example, to be correspondingly smaller and therefore more cost effective. The high dynamic properties of the actuating motor, which were previously necessary as the actuating motor was used to deflect the wheels in emergency operation, may no longer be required as a result of an example embodiment according to the present invention, and this may lead to a considerably more cost effective configuration of the actuating motor or motors.

It may be provided for the pressure accumulator to be mounted on the steering mechanism of the steering system.

Such a refinement may be particularly suitable, reliable and simple to implement in design terms.

The pressure accumulator may have rigid tubes.

The pressure accumulator may be equipped with rigid tubes rather than use flexible tubes. In particular, reliability and handling, for example, for installation purposes, may be improved as a result.

Further developments and refinements of the present invention emerge from the exemplary embodiments depicted in principle below using the drawings.

DETAILED DESCRIPTION

The steering system according to an example embodiment of the present invention, as described in greater detail below, has components of a hydraulic rack and pinion steering system for motor vehicles which may be of conventional construction (see, e.g., European Published Patent Application No. 0 624 135).

Figure 1:
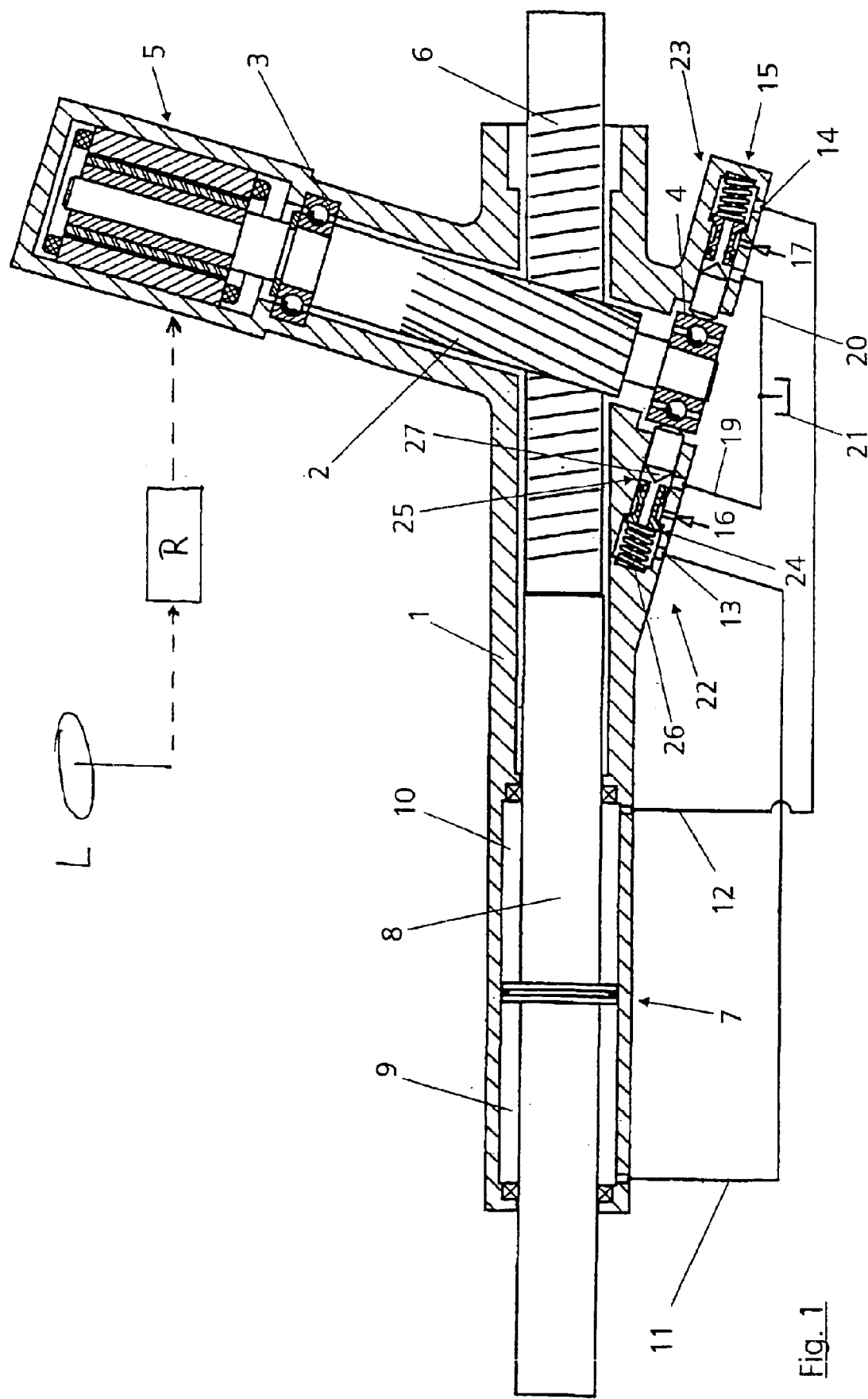
FIG. 1 is a longitudinal cross-sectional view through a rack and pinion steering system.

FIG. 1 illustrates a steering housing 1 in which a pinion 2 is mounted in a locating bearing 3 and a floating bearing 4. The pinion 2 has an actuating motor 5 at one end. The actuating motor 5 is controlled, via a control circuit R, by a steering handwheel L actuated by the driver of the respective vehicle, with the result that said actuating motor 5 rotates in a manner corresponding to the change in steering angle to be set. Reference is made, for example, to German Published Patent Application No. 195 41 749 concerning the functional principle of such an actuating motor 5.

The pinion 2 is in engagement, via its toothing, with a rack 6 which is guided in the steering housing 1 in axially displaceable fashion. A servomotor 7, whose piston rod 8 is permanently connected to the rack 6, serves to provide power assistance. The servomotor 7 has two cylinder spaces 9 and 10 which are connected to two cylinder connections 13 and 14 of a control valve device 15 via working lines 11 and 12. The control valve device 15 has two feed line connections 16 and 17, to which a pressure medium source 18 (shown in greater detail, for example, in FIG. 2) is connected. The control valve device 15 has two return line connections 19 and 20, to which a container 21 is connected.

Figure 2:
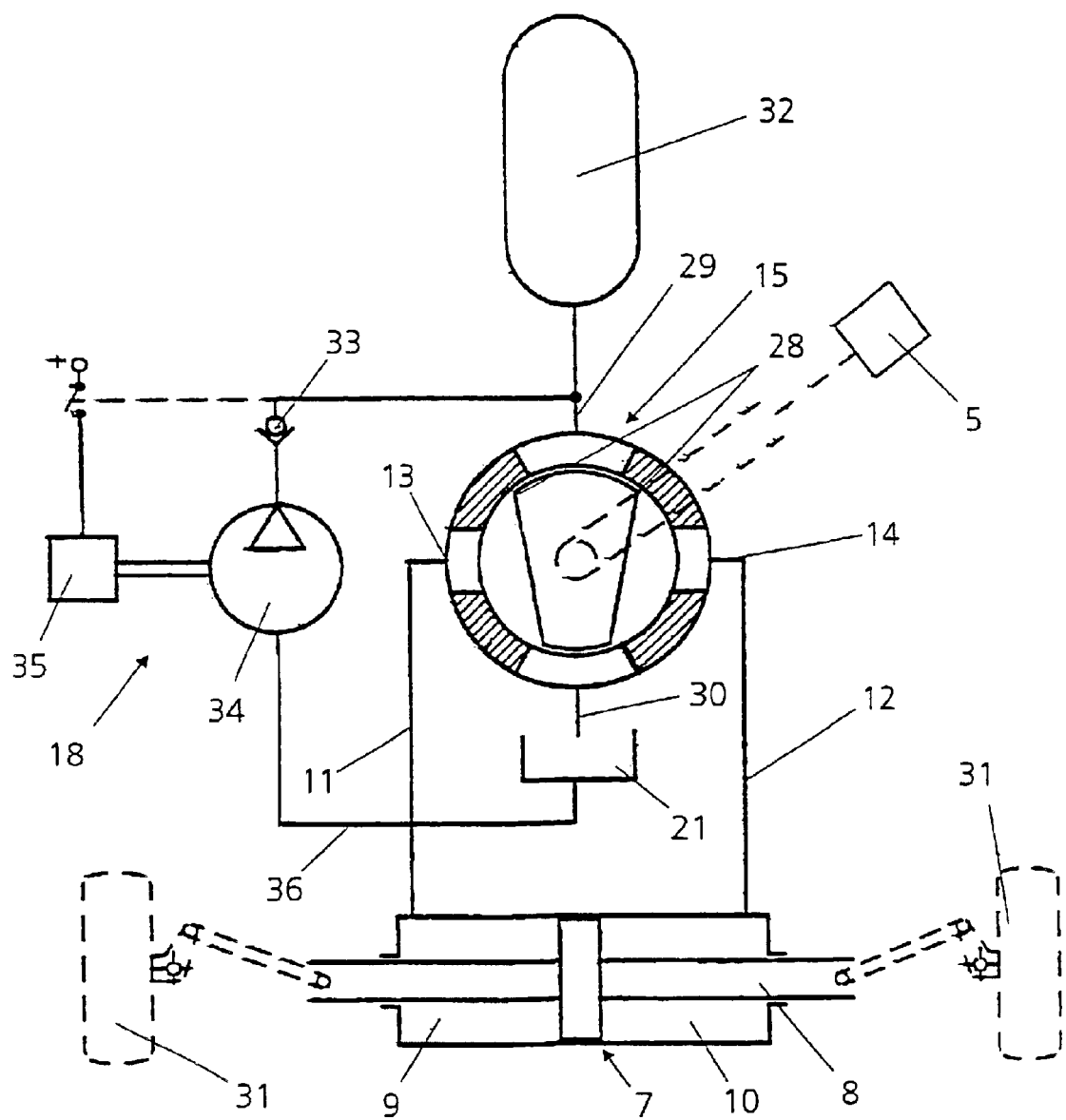
FIG. 2 is a schematic view of a steering system with actuation of the control valve device by an actuating motor which is not positively coupled.

A pressure medium accumulator 32, arranged between the pressure medium source 18 and the control valve device 15, is illustrated in FIG. 2.

The control valve device 15 illustrated in FIG. 1 has two control valves configured as seat valves 22 and 23. The seat valves 22 and 23 each have an inlet seat valve 24 and an outlet seat valve 25. As illustrated in FIG. 1, the inlet seat valve 24 is held closed in the neutral position by the force of a spring 26. The outlet seat valve 25 is open in the neutral position. This is therefore a control valve device 15 with what is referred to as a closed center.

A closing body 27 of each outlet seat valve 25 adjoins the floating bearing 4.

The functioning of the exemplary embodiment illustrated in FIG. 1 is described in the following text. If the pinion 2 is rotated by a rotational movement of the actuating motor 5, for example, in order to steer to the right, then the toothing of the pinion 2 initially rolls along in the toothing of the rack 6 which at that point is still stationary. As a result, as described in greater detail in European Published Patent Application No. 0 624 135, the seat valves 22 and 23 are acted on so that a pressure is built up in the cylinder space 9, which pressure pushes the rack 6 to the right in accordance with the desired steering movement.

An example embodiment of the present invention results from FIG. 2. A steering intention is passed, e.g., in a conventional manner to the abovedescribed actuating motor 5. The actuating motor 5 thereupon controls the control valve device 15, which is configured as a rotational slide valve in FIG. 2, in a manner which may be influenced by various parameters, such as side wind, etc. The rotational slide valve 15 is illustrated in the neutral position in FIG. 2 and has a closed center. Here, the control edges 28 of the rotational slide valve 15 are moved by a corresponding rotational movement of the actuating motor 5, with the result that the working line 11 or 12 are connected to a feed line 29. A working pressure may thus be built up, e.g., in a conventional manner, in the corresponding cylinder space 9 or 10 in the servomotor 7. The pressure medium flows from the respective other cylinder space 9 or 10, e.g., in a conventional manner through the respective feed line 11 or 12 into a return line 30 and from there into the container 21. The vehicle wheels 31 indicated in FIG. 2 are deflected by the servomotor 7, under some circumstances in connection with the steering effect of a rack 6.

A pressure medium source 18 and a pressure medium accumulator 32 are connected to the feed line 29. The pressure medium source 18 and the pressure accumulator 32 produce the pressure necessary to control the servomotor 7 in order to deflect the vehicle wheels 31. Depending on the application, the pressure medium accumulator 32 may assist the pressure medium source 18 or supply the necessary pressure or the necessary energy exclusively. The pressure medium accumulator 32 may thus provide peak loads, when required, so that the pressure medium source 18 merely has to supply a mean output. If the hydraulic system fails, the vehicle wheels 31 may be steered by the pressure contained in the pressure medium accumulator 32, such that it is possible to safely stop the vehicle.

The pressure medium source 18 has a pump 34, provided with a nonreturn valve 33, and an electric motor 35 supplying the pump 34. A different configuration is possible.

In the exemplary embodiment illustrated, the pump 34 is configured as a switchable charge pump for a mean energy supply. The peak energy may be obtained from the pressure medium accumulator 32, which is configured such that the peak load, e.g., for parking maneuvers, is covered without the pressure in the pressure medium accumulator 32 falling to such an extent that it is not sufficient for steering operations.

The pressure medium accumulator 32 may be configured such that it is possible to steer the vehicle wheels 31 from stop to stop at least three times even if the pressure medium source 18 fails. This arrangement may be sufficient to bring the vehicle to a standstill without problems.

It may be possible for the pressure medium accumulator 32 to be provided with a device for sensing the accumulator pressure. The pump 34 or the electric motor 35 may thus be actuated using the accumulator pressure of the pressure medium accumulator 32. It is thus possible to control the pump 34 in a targeted fashion as a function of the accumulator level.

As the actuating motor 5 may not need to be used to actuate the vehicle wheels 31 or for an emergency steering function, it is possible to design the actuating motor 5 exclusively for actuating the rotational slide valve 15 and hence cost effectively. A torque of at most approximately 5 Nm may be sufficient for the actuating motor 5.

It may be provided for the actuating motor 5 to be of redundant configuration. This may serve to further increase the safety and to fulfill legal requirements.

It may be provided in alternative example embodiments for the pressure medium source 18 to first convey the pressure medium into the pressure medium accumulator 32 and then from there toward the control valve device 15. It may also be possible both to connect the pressure medium source 18 to the pressure medium accumulator 32 and also to connect it directly to the control valve device 15 by the feed line. As illustrated in FIG. 2, a return line 36 leads from the container 21 to the pump 34, e.g., in a conventional manner.

There may be a mechanical connection between the control valve device 15 and the rack which is coupled to the servomotor 7.

It may be possible to provide a different type of mechanism, for example, a recirculating ball mechanism, instead of the rack and pinion. In general, it is possible to refer to a driving part instead of "pinion" and a driven part instead of "rack".

LIST OF DESIGNATIONS

L Steering handle
R Control circuit
1 Steering housing
2 Pinion
3 Locating bearing
4 Floating bearing
5 Actuating motor
6 Rack
7 Servomotor
8 Piston rod
9 Cylinder space
10 Cylinder space
11 Working line
12 Working line
13 Cylinder connection
14 Cylinder connection
15 Control valve device
16 Feed line connection
17 Feed line connection
18 Pressure medium source
19 Return line connection
20 Return line connection
21 Container
22 Control/seat valve
23 Control/seat valve
24 Inlet seat valve
25 Outlet seat valve
26 Spring
27 Closing body
28 Control edges
29 Feed line
30 Return line
31 Vehicle wheels
32 Pressure medium accumulator
33 Nonreturn valve
34 Pump
35 Electric motor
36 Return line
37 Steering wheel

What is claimed is:

1. A steering system for a motor vehicle including a hydraulic rack and pinion steering system, comprising
a steering handle configured to prescribe a steering intention and adjustable by a driver,
a rotatably mounted pinion arranged in engagement with an axially displaceable rack,
a control valve device having a closed center,
a hydraulic servomotor including a piston rod drive-connected to the rack and arranged to provide power assistance, the servomotor including two cylinder spaces connected to two cylinder connection on the control valve device via working lines,
a pressure medium source, the pressure medium source and the control valve device configured to provide control of a fluid of pressure medium to and from the servomotor to deflect vehicle wheels,
a pressure medium accumulator configured to produce and/or assist the flow of the pressure medium to and from the servomotor so that the vehicle wheels are steerable at least three times from a first stop to a second stop, if the pressure medium source fails, and,
an electric actuating motor arranged at one end of the pinion, and not positively coupled to the steering handle,
the actuating motor controllable via a control circuit by the steering handle, and is configured to actuate the control valve device.

2. The steering device according to claim 1, wherein the actuator motor has a redundant configuration.

3. The steering device according to claim 1, wherein the pressure medium source includes a pump having a nonreturn valve and an electric motor configured to drive the pump.

4. The steering device according to claim 3, wherein the pump is arranged as a switchable charge pump for mean energy supply to the servomotor.

5. The steering device according to claim 1, wherein the pressure accumulator, supplied by the pressure medium source, is configured to reliably ensure energy supply to the servomotor for a parking maneuver.

6. The steering device according to claim 1, wherein the pressure medium accumulator includes a device configured to sense accumulator pressure.

7. The steering device according to claim 1, wherein the actuator motor is configured to produce a torque of at most 5 Nm.

8. The steering device according to claim 1, wherein the pressure medium accumulator is mounted on a steering mechanism.

9. The steering device according to claim 1, wherein the pressure medium accumulator includes rigid tubes.

10. The steering device according to claim 1, wherein the control valve device is configured as two seat valves.

11. The steering device according to claim 1, wherein the control valve device is configured as a rotational slide valve.

12. A steering system for a motor vehicle including a hydraulic rack and pinion steering system, comprising a steering handle configured to prescribe a steering intention and adjustable by a driver, a rotatably mounted pinion arranged in engagement with an axially displaceable rack, a control valve device having a closed center, a hydraulic servomotor including a piston rod drive-connected to the rack and arranged to provide power assistance, the servomotor including two cylinder spaces connected to two cylinder connection on the control valve device via working lines, a pressure medium source, the pressure medium source and the control valve device configured to provide control of a fluid of pressure medium to and from the servomotor to deflect vehicle wheels, a pressure medium accumulator configured to produce and/or assist the flow of the pressure medium to and from the servomotor so that the vehicle wheels are steerable at least three times from a first stop to a second stop, if the pressure medium source fails, and, an electric actuating motor arranged at one end of the pinion, and not positively coupled to the steering handle, the actuating motor controllable via a control circuit by the steering handle, and is configured to actuate the control valve device.

13. The steering device according to claim 12, wherein the driving part and the driven part form one of a recirculating ball mechanism and a recirculating roller mechanism.

* * * * *